(12) United States Patent
Grueger (10) Patent No.: US 7,728,973 B2
(45) Date of Patent: Jun. 1, 2010

(54) LINE CAMERA FOR SPECTRAL IMAGING

(75) Inventor: Heinrich Grueger, Dresden (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 479 days.

(21) Appl. No.: 11/740,138

(22) Filed: Apr. 25, 2007

(65) Prior Publication Data

US 2007/0252990 A1   Nov. 1, 2007

(30) Foreign Application Priority Data

Apr. 28, 2006   (DE)   ................ 10 2006 019 840

(51) Int. Cl.
*G01J 3/28* (2006.01)
(52) U.S. Cl. .................................... 356/328
(58) Field of Classification Search ................ 563/308, 563/328
See application file for complete search history.

(56) References Cited

U.S. PATENT DOCUMENTS 5,471,321 A * 11/1995 Setani ......................... 358/474

2005/0057750 A1 * 3/2005 Schenk et al. ............... 356/328
2005/0057751 A1 * 3/2005 Schenk et al. ............... 356/328

FOREIGN PATENT DOCUMENTS

| DE | 4426475 | 1/1996 |
|---|---|---|
| DE | 10047269 | 4/2002 |
| WO | WO03/069290 | 8/2003 |

* cited by examiner

*Primary Examiner*—Kara E Geisel
(74) *Attorney, Agent, or Firm*—Michael A. Glenn; Glenn Patent Group

(57) ABSTRACT

An apparatus for the detection of spectral information along a geometrical line with a dispersive element, which is suspended from an axis of rotation, for the spectral dispersion of electromagnetic radiation from a range on the geometrical line into spectral constituents, a line detector for the detection of the spectral constituents of the radiation emanating from the range on the geometrical line and a dispersive-element deflector, the deflector being designed to deflect the dispersive element on the axis of rotation, so that depending on an angle of deflection a radiation from another range of the geometrical line is incident on the line detector.

35 Claims, 8 Drawing Sheets

| $\lambda_k$ | $I(\lambda_k, x_1)$ | $I(\lambda_k, x_2)$ | $I(\lambda_k, x_3)$ | | $I(\lambda_k, x_{N-1})$ | $I(\lambda_k, x_N)$ |
|---|---|---|---|---|---|---|
| $\lambda_{k-1}$ | $I(\lambda_{k-1}, x_1)$ | | | | $I(\lambda_{k-1}, x_{N-1})$ | $I(\lambda_{k-1}, x_N)$ |
| . | . | . | . | . | | |
| . | . | . | . | . | | |
| . | . | . | . | . | | |
| $\lambda_3$ | $I(\lambda_3, x_1)$ | $I(\lambda_3, x_2)$ | $I(\lambda_3, x_3)$ | | | $I(\lambda_3, x_N)$ |
| $\lambda_2$ | $I(\lambda_2, x_1)$ | $I(\lambda_2, x_2)$ | $I(\lambda_2, x_3)$ | | | $I(\lambda_2, x_N)$ |
| $\lambda_1$ | $I(\lambda_1, x_1)$ | $I(\lambda_1, x_2)$ | $I(\lambda_1, x_3)$ | | $I(\lambda_1, x_{N-1})$ | $I(\lambda_1, x_N)$ |
| | $x_1$ | $x_2$ | $x_3$ | . . . | $x_{N-1}$ | $x_N$ |

| | $x_1$ | $x_2$ | $x_3$ | | | | | | | $x_{N-1}$ | $x_N$ |
|---|---|---|---|---|---|---|---|---|---|---|---|
| $y_M$ | | 300 | 300 | | | | | | | | |
| $y_{M-1}$ | | 300 | 300 | 300 | | | | | | 300 | 300 |
| | | 300 | 300 | | | | | | | 300 | |
| | | | | | | | | | | | |
| | | | | | | 302 | | | | | |
| | | | | | | 302 | 302 | | | | |
| | | | | | 302 | 302 | 302 | | | | |
| $y_3$ | | | | | | 302 | 302 | 302 | | | |
| $y_2$ | | 302 | | | | | | | | | |
| $y_1$ | | 302 | | | | | | | | | |

FIGURE 6

LINE CAMERA FOR SPECTRAL IMAGING

CROSS-REFERENCE TO RELATED APPLICATIONS

This application claims priority from German Patent Application No. 10 2006 019 840.9, which was filed on Apr. 28, 2006, and is incorporated herein by reference in its entirety.

TECHNICAL FIELD

The present invention generally relates to spectrometry and, in particular, to a system and a method for capturing optical images, which were resolved according to spectral portions, along a geometrical line.

BACKGROUND

Figure 6:
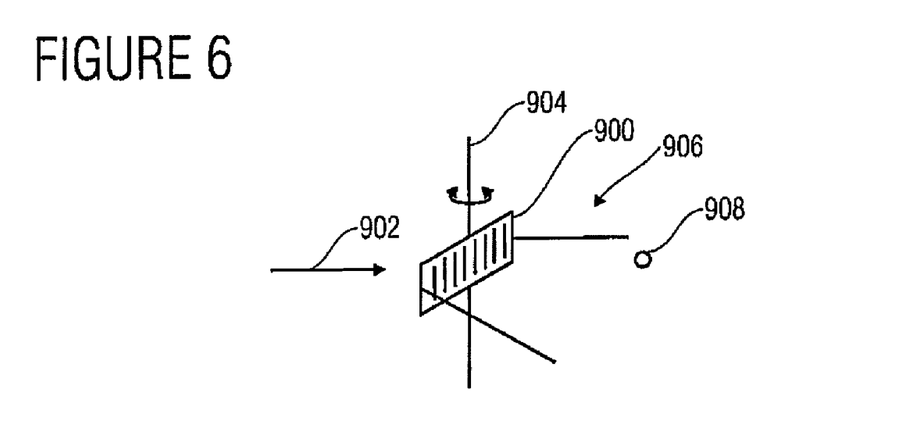
FIG. 6 is a schematic representation of a conventional type of a spectrometer.

As is known, a spectrometer enables measuring light in a certain spectral range depending on wavelengths. The core pieces of each spectrometer are a dispersive element such as a grating or a prism the light, the spectral distribution of which is to be determined, is incident to and which disperses the incident light into its spectral constituents, and a respective detector for acquiring one or several of the spectral constituents. FIG. 6 shows a classical arrangement of a grating spectrometer. A moveable grating 900 is illuminated through an entrance slot and a bundling element (not shown) by a beam of light 902, the spectral distribution of which is to be determined. The movable grating 900 is hinged to an axis that runs in parallel to the grating lines. Grating 900 is adjusted quasi-statistically, typically via a stepper motor. The light 906 split according to wavelengths—more precisely a spectral constituent thereof—is detected by means of a detector element 908, while the grating 900 is moved into different positions. This way, the light 906, which is split according to wavelengths in a plane perpendicular to the axis of rotation, is sampled by means of detector 908, while the measurement signals thereof are recorded correspondingly in order to determine the spectral distribution of the beam of light 902.

Spectrometers are used, among others, in so-called spectral imaging systems. A spectral imaging system is a sensor system that simultaneously acquires spectral and spatial information, which provides the entire mechanical, electronical and optical periphery, which analyses combination data and forwards the analytical values. In the visible spectral range (380-780 nm wavelength), the demands made on spectral imaging systems may be sufficiently well met by systems with two-dimensional detector arrangements (CCD image sensors and/or so-called 2D array detectors). Here, the geometrical line to be evaluated is imaged via a fixedly mounted diffraction grating onto the detector surface. A representation is then obtained on the two-dimensional detector, wherein one direction corresponds to the geometrical component and the other to the wavelength. Thus, a spectral intensity distribution may be determined for each geometrical location of the line. Suitable detectors are available with a very large number of detector elements, presently up to the double-digit million area, for example as a chip with 3,000×5,000 elements and more.

Due to natural and technical constraints, measurements specifically in the infrared spectral range are often necessary. This is, almost without exception, indispensable especially for applications that demand measurements during the night without direct illumination by the sun or additional artificial light sources. The infrared spectral range lies above the sensitivity limit of silicon detectors (1,300 nm wavelength). In this range, the availability of suitable detectors, particularly of two-dimensional arrangements, are very limited. Monolithically integrated devices are presently very expensive. The number of detector elements is comparably low already in the case of line arrangements. Presently, lines with 256-512 elements are commercially available. Under the use of infrared spectrometers, which, as a rule, comprise InGaAs (Indium-Gallium-Arsenide) line detectors and fixedly mounted gratings, such systems may be realized by combination with a so-called sample unit for beam control. The system expenditure, however, is very high and the systems operate conditionally low with simultaneously limited picture-dot resolution. The complex technology is sensitive with regard to the adjustment of the assemblies to one another and with regard to interferences from the environment.

One conceivable realization alternative for the solution of the problem comprising an oscillating grating chip, as described in publication document WO 03069290 A1, has the disadvantage that the spectral resolution through the movement area takes place with a very fine resolution, which is, however, not advantageous due to the optical constraints, which, however, provides for the geometrical resolution by the relatively small number of detector elements. A geometrical resolution of only 256-512 dots is for a number of applications not sufficient.

SUMMARY

According to an embodiment, an apparatus for the detection of spectral information along a geometrical line may have: a dispersive element suspended from an axis of rotation for the spectral dispersion of an electromagnetic radiation from a range on the geometrical line into spectral constituents; a line detector for the detection of the spectral constituents of the radiation emanating from the range on the geometrical line; and a dispersive-element deflector, wherein the deflector is adapted to deflect the dispersive element on the axis of rotation so that depending on a angle of deflection a radiation from another range on the geometrical line is incident on the line detector.

According to another embodiment, a system for examining a geometrical surface may have: an apparatus for the spectral detection of a geometrical line, having: a dispersive element suspended from an axis of rotation for the spectral dispersion of an electromagnetic radiation from a range on the geometrical line into spectral constituents; a line detector for the detection of the spectral constituents of the radiation emanating from the range on the geometrical line; and a dispersive-element deflector, wherein the deflector is adapted to deflect the dispersive element on the axis of rotation so that depending on a angle of deflection a radiation from another range on the geometrical line is incident on the line detector; a generator of a relative movement of the surface with respect to the apparatus, wherein the apparatus for the spectral detection is adapted to detect a plurality of different geometrical lines on the basis of the relative movement running perpendicular to the geometrical line; and a processor of the plurality of different geometrical lines in order to receive information on the constitution of the geometrical surface.

According to another embodiment, a method for the spectral detection of a geometrical line may have the steps of: spectrally dispersing an electromagnetic radiation of a range on a geometrical line into spectral constituents with a dispersive element, which is suspended from an axis of rotation; detecting the spectral constituents of the radiation emanating from the range of the geometrical line with a line detector; and deflecting the dispersive element on the axis of rotation, so that depending on a angle of deflection a radiation from another range of the geometrical line is incident on the line detector.

According to another embodiment, a method for the examination of a geometrical surface may have the steps of: spectrally dispersing an electromagnetic radiation from a range on the geometrical line into spectral constituents with a dispersive element, which is suspended from an axis of rotation; detecting the spectral constituents of the radiation emanating from the range on the geometrical line with a line detector; and deflecting the dispersive element on the axis of rotation so that depending on a angle of deflection a radiation from another range on the geometrical line is incident on the line detector; generating a relative movement of the surface with respect to the dispersive element and the line detector, wherein the dispersive element and the line detector are adapted to detect a plurality of different geometrical lines on the basis of the relative movement running perpendicular to the geometrical line; and processing the plurality of different geometrical lines in order to receive information on the constitution of the geometrical surface.

According to another embodiment, a computer program may have: a program code for performing, when the computer program is executed on a computer or a microcontroller, a method for the spectral detection of a geometrical line, the method having the steps of: spectrally dispersing an electromagnetic radiation of a range on a geometrical line into spectral constituents with a dispersive element, which is suspended from an axis of rotation; detecting the spectral constituents of the radiation emanating from the range of the geometrical line with a line detector; and deflecting the dispersive element on the axis of rotation, so that depending on a angle of deflection a radiation from another range of the geometrical line is incident on the line detector.

According to another embodiment, a computer program may have a program code for performing, when the computer program is executed on a computer or a microcontroller, a method for the examination of a geometrical surface, the method having the steps of: spectrally dispersing an electromagnetic radiation from a range on the geometrical line into spectral constituents with a dispersive element, which is suspended from an axis of rotation; detecting the spectral constituents of the radiation emanating from the range on the geometrical line with a line detector; and deflecting the dispersive element on the axis of rotation so that depending on a angle of deflection a radiation from another range on the geometrical line is incident on the line detector; generating a relative movement of the surface with respect to the dispersive element and the line detector, wherein the dispersive element and the line detector are adapted to detect a plurality of different geometrical lines on the basis of the relative movement running perpendicular to the geometrical line; and processing the plurality of different geometrical lines in order to receive information on the constitution of the geometrical surface.

The invention is based on the finding that the one-dimensional geometrical sampling and the simultaneous spectral dispersion of the light may be achieved by a dispersive element with an axis of rotations, the spectral dispersion taking place in a plane running through the axis of rotation. The device containing the dispersive element may, for example, be produced by means of precision, micro-system or plastic engineering, or by silicon micro mechanics. This makes it possible to construct a system comprising the function of a line camera with simultaneous in-situ detection of the spectral intensity distribution, whereas for the detection, only a one-dimensional line detector is necessary.

This results in a substantial price advantage, especially in the NIR (near infrared) spectral range above 1,300 nm wavelength. In the use of micromechanical components, specifically in silicon micro technologies, the devices exhibit a high degree of robustness, which is of essential advantage especially in mobile use. The assemblies are very lightweight and may be fabricated at low cost in large numbers of pieces by means of production in the wafer compound.

Micromechanically fabricated devices, which contain grating structures on a movable plate, are known (WO 03069290 A1). Using an embodiment of these devices, which are produced in a silicon micro-technology, spectrometers for the ultra-violet, visible or infrared spectral ranges have successfully been constructed. The basic property is that the grating realized in the device may be tilted along an axis which is parallel to the grating lines. By this, a single detector suffices for detecting the spectral intensity distribution. In former embodiment variants of such systems comprising a stationary grating, the intensity distribution is detected by accordingly more complex linear detector lines without a mechanical movement being necessary.

With the inventive apparatus, with a reasonable detection width range of 1,100 to 1,700 nm (the typical wavelength range being 900-2,000 nm, the extreme one being 800-2,500 nm), spectral resolutions of less than 10 nm will already be achieved by the use of detectors of only 256 elements, which is, almost without exception, sufficient in this area. The geometrical resolution, which should be as fine as possible, is determined by a movement of the device and a data rate of the detector. If micromechanical silicon devices of an oscillating frequency of 500 Hz and detectors having a processing rate of 3 million signals per second are used, 3,000 dots are resolved per semi-oscillation; with slower devices having an oscillating frequency of for example 150 Hz, 10,000 picture dots may also seem realizable.

An embodiment of the apparatus includes a dispersive element for the spectral dispersion of a beam of light, the spectral distribution of which is to be determined, into spectral constituents, as well as a suspension for carrying the dispersive element and for biasing same with a biasing force into an idle position when the dispersive element is in a deflected position. According to an embodiment, the dispersive element is a micromechanically fabricated mirror with a phase or amplitude modulation grating structure at the mirror surface, the mirror being suspended from two opposite sides along a central axis of rotation from two crosspieces in the form of two torsion springs. The apparatus further includes means in order to set the dispersive element oscillating, and specifically resonantly oscillating, by performing the variation of the deflected position accordingly fast at an oscillation frequency $\omega_0$ by means of a control unit, so the different spectral constituents of beams of light emanating from different dots located on a geometrical line are rendered detectable for a detector of the apparatus.

According to the invention, the mobility of the dispersive element is linked to the use of a detector line consisting of several detector elements such as a conventional miniature spectrometer, the detector line being arranged in a plane running through the axis of rotation of the dispersive element. Starting from a geometrical line, several recordings along the line are combined with one another for the determination of the spectral distribution of the light.

According to an embodiment of the present invention, an apparatus for spectral detection of a geometrical line includes a dispersive element suspended from an axis of rotation for the spectral dispersion into spectral constituents of electromagnetic radiation from a range of the geometrical line, a line detector for the detection of the spectral constituents of the radiation emanating from the range of the geometrical line, and means for deflecting the dispersive element, the means for deflecting being designed to deflect the dispersive element on the axis of rotation, so that depending on the angle of deflection, radiation from another range of the geometrical line is incident on the line detector.

Each detector element of the line detector at a certain point in time detects a different spectral constituent of an incident beam of light emanating from a range of the geometrical line, the range comprising one or more dots. By means of exposure periods not disappearing, certain spatial expansions of the line detector as well as the movement of the dispersive element, it will generally not be possible to spectrally detect exactly one dot of the geometrical line but only a range of dots. For reasons of clarity, the term "dots" will still be used in the following.

The spectral constituents, which were detected at a certain point in time by the detector elements of the detector line, combine to form a recording or exposure of a dot of the line. Which dot is presently being detected depends on the position of the dispersive element during the exposure or recording. For the determination of the spectral distribution of the light emanating from the geometrical line, several recordings along said line are performed, which are controlled by a control unit, wherein the dispersive element is tilted on its axis of rotation by an angle element between two succeeding recordings. By this, a total of one optical imaging of a linear geometrical range into a detector plane is achieved. If the detector is embodied as a line, the detector elements will be illuminated by light of different wavelengths due to the dispersive effect of the dispersive element, whereby a spectral intensity distribution of a beam of light is detected. By rotating the dispersive element on its axis of rotation, the spatial distribution of the geometrical line to be imaged is then detected in a time-resolved manner during a short period of time.

Furthermore, a spectral intensity distribution of an entire object surface to be spectrally detected is measured by a comparatively slow relative movement between an object to be inspected and an entire detection means encompassing the dispersive element and the line detector. After the measurement, a measured spectral intensity distribution $I(\lambda,x,y)$ can be given for each dot (x,y) of the surface and the desired information on the objects to be detected may be determined from these intensities.

BRIEF DESCRIPTION OF THE DRAWINGS

Embodiments of the present invention will be detailed subsequently referring to the appended drawings, in which:

FIG. 2b is a principle of effect of a line camera according to FIG. 2a;

FIG. 5b is a sectional elevation of the application scenario of FIG. 5a;

FIG. 5c is a cross sectional view of the application scenario of FIG. 5a;

DETAILED DESCRIPTION

Prior to describing special embodiments of the present invention with reference to FIGS. 2a to 5d, an embodiment for a suspension of the dispersive element as well as for its deflection will be described in the following with respect to FIG. 1 in order to achieve a deflection thereof on its axis of rotation.

Figure 1:
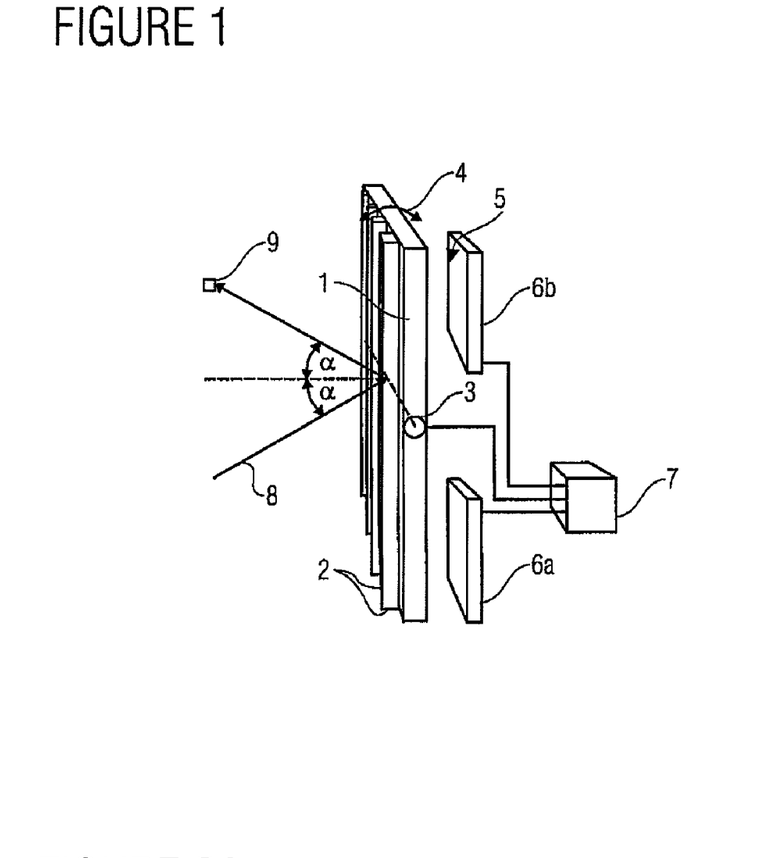
FIG. 1 is a schematic perspective view of a micromechanically fabricated phase or amplitude modulation grating suspended from a torsion spring, which is capacitively deflected, according to an embodiment of the present invention.

FIG. 1 shows a grating deflectable by means of electrostatic forces. The grating is micromechanically fabricated and consists of a rectangular plate 1, which has, on its main side, a structure 2 for phase or amplitude modulation thus serving as a reflection grating. Plate 1 is carried on-center along a central axis via two crosspieces 3 on two opposite sides, so that plate 1 may be pivoted on the axis defined by portion springs 3, as is illustrated by means of double arrow 4. Here, crosspieces 3 serve as a torsion spring exerting a bias force into the idle position of plate 1 which depends on the deflection 4 of plate 1 from the idle position, as illustrated in FIG. 1, for example is proportional to same. Via a gap 5, two electrodes 6a and 6b are arranged opposite to the non-structured main side of plate 1, each on one of the halves defined by the axis running through torsion springs 3. Electrodes 6a and 6b act capacitively together with plate 1, which, in order to achieve this, either consists of a conducting material or else has a conducting layer, for example on the side opposite electrodes 6a and 6b.

After in the foregoing, the structure of a deflectable grating according to an embodiment of the present invention has been described, the function thereof will be described in the following. Plate 1 or the conductive area thereof is held on a defined potential via torsion spring 3. In order to achieve this, the plate either itself consists of a conductive material, or it has a conductive layer, for example, on its entire underside or else only at the locations above electrodes 6a and 6b. If a voltage is applied between plate 1 and electrode 6a, plate 1 will tilt or pivot (from the viewer's perspective) in a counterclockwise manner towards electrode 6a up to the moment when the electrostatic moment and the mechanical moment arising from the torsion of crosspieces 3 are balanced. Similarly, by applying a voltage between plate 1 and electrode 6b, a deflection of plate 1 in a clockwise manner towards electrode 6b will be achieved. If the voltage is turned off, plate 1 will return to its idle position by means of the mechanical restoring force of torsion springs 3 depending on the attenuation by crosspieces 3. The attenuation should be suitable to prevent the plate from overshooting on the one hand and from returning into its idle position too slowly on the other hand. In the case of vibrations or jolts, plate 1 will return into its deflected position, which is defined by the potential difference between electrode 6a and plate 1 and/or electrode 6b and plate 1 on the one hand and the restoring force of torsion springs 3 or the spring constant defined by same on the other hand. Suitable adjustment of the attenuation may prevent plate 1 from excessively oscillating to and fro. As the attenuation and the spring constant are determined by the diameter of the crosspieces, it may be advantageous to find a suitable tradeoff when adjusting the attenuation and the spring constant.

Control means 7, which is conductively connected to electrodes 6a and 6b as well as plate 1, controls the potential difference between plate 1 and electrode 6a and/or plate 1 and electrode 6b, depending on whether the plate is to be tilted clockwise or counter-clockwise. For ease of understanding, the controller is represented in a simplified manner in FIG. 1, and is performed for example, by means of driving a voltage source in order to adjust the output voltage thereof, and selecting the electrode the output voltage is to be applied to, wherein the plate and the electrode not selected are connected to ground. By means of varying the potential difference and, therefore, the electrostatic moment, control means 7 adjusts different deflection positions of plate 1. Depending on the adjusted deflection of plate 1 and, therefore, of grating 2, a detector 9, which is positioned at a suitable distance from the structured surface 2 of plate 1, will detect a spectral constituent of a scattered beam of light 8 which is incident on and emerging from grating 2 at an angle $\alpha$.

It is to be understood that as an alternative to the embodiment of FIG. 1, the grating may also be biased into an idle position in another way. Plate 1 could, for example, be one-end clamped in order to be capacitively attracted by an electrode and, therefore, be deflectable—in one direction— wherein there will be a balance between the electrostatic moment and the bending moment. Furthermore, instead of the electrostatic deflection described in FIG. 1, an inductive or piezoelectric deflection might be used.

As has already been described, only a spectral constituent of a beam of light is detected by detector 9, the origin of which is located at the angle $\alpha$ relative to the surface of plate 1. In order to correlate the measurement values detected by detector 9 with the presently detected angle position $\alpha$, additional means (not shown) may be provided, which detects the deflection of plate 1 at the moment of detection of detector 9, either capacitively, piezo-resistively, inductively or optically. These measurement values may then be used both for an allocation in terms of angles to the sample values of detector 9 and also for a feedback to control means 7. Alternatively, the characteristic curve of the system of the plate and torsion spring, that is the correlation between potential difference and deflection, may be prerecorded and used by control means 7 for the determination of the angle of deflection $\alpha$ at a given voltage.

Figure 2A:
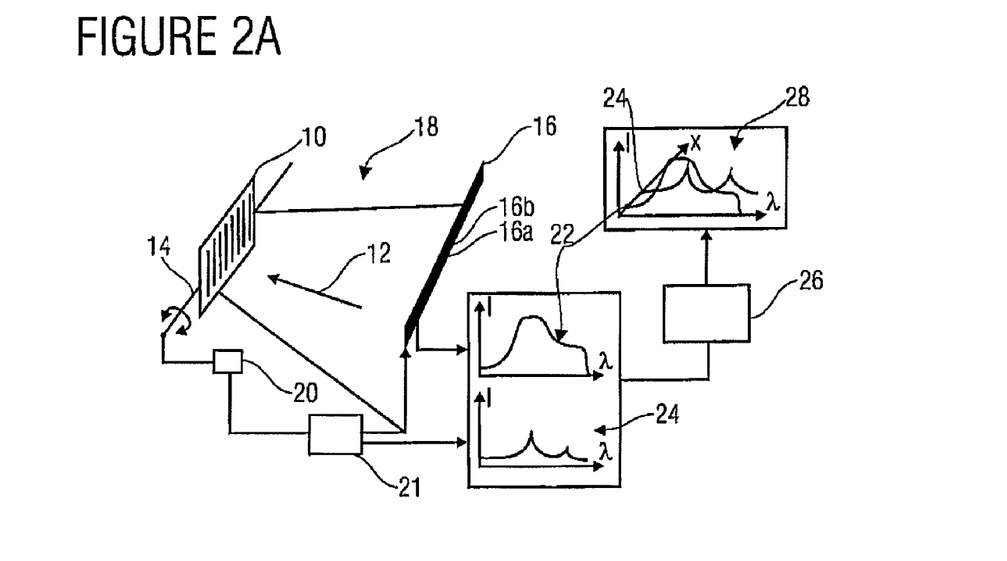
FIG. 2a is a schematic representation of a line camera according to an embodiment of the present invention.
Figure 2B:
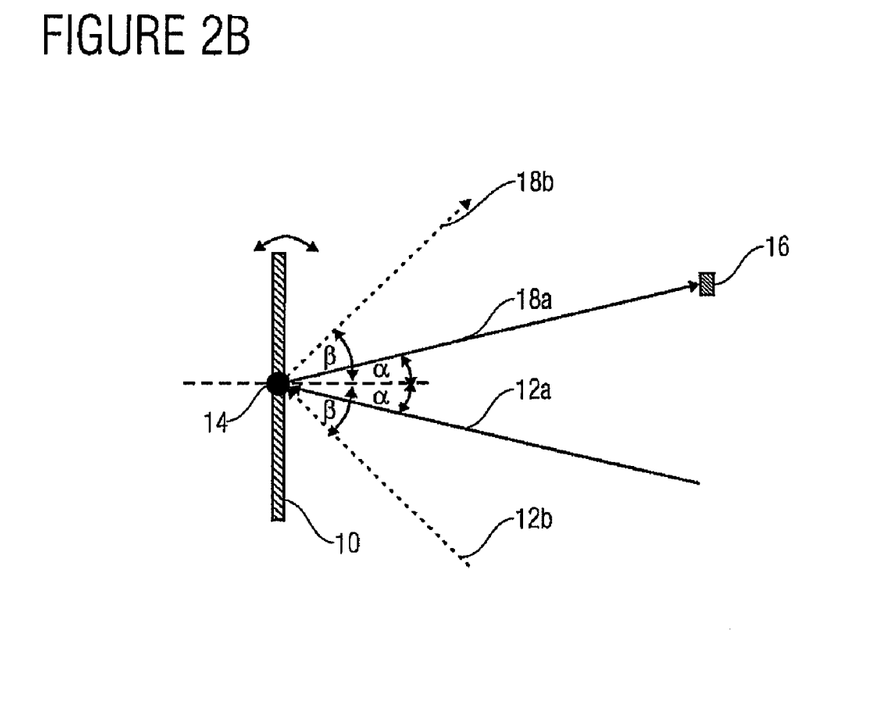
Figure 2C:
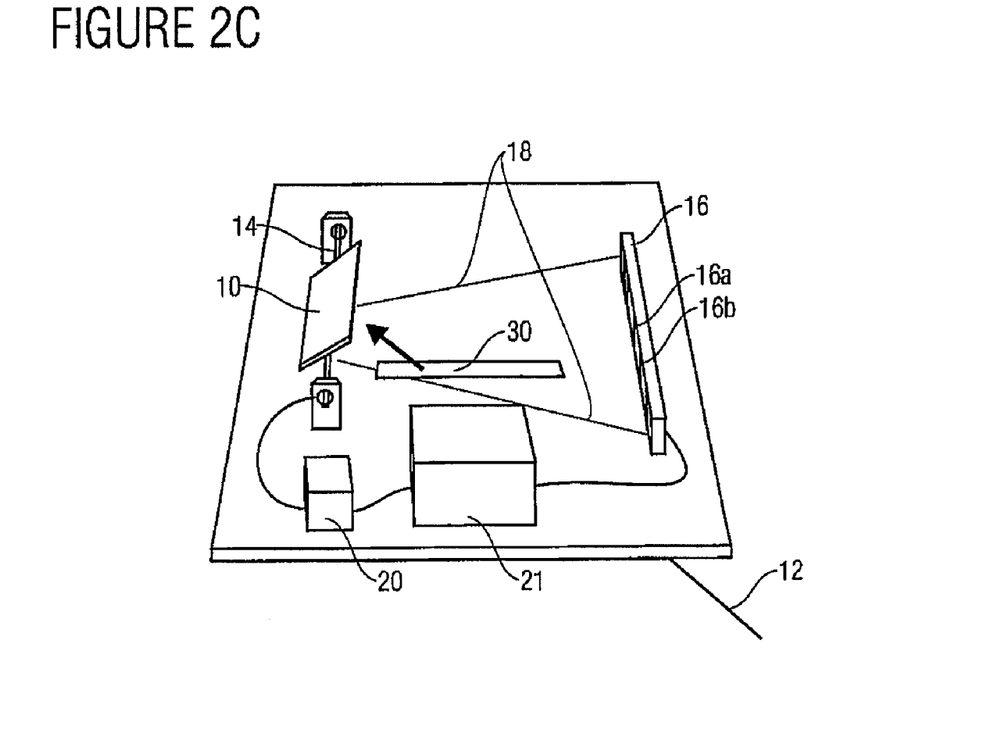
FIG. 2c is a schematic representation of a line camera having a light entrance slot, according to a further embodiment of the present invention.

Referring now to FIGS. 2a, 2b and 2c, an embodiment of the present invention will now be described in which a detector line 16 is used as a detector.

The apparatus for the spectral detection of a geometrical line according to FIG. 2a includes a movable mirror grating 10 a beam of light 12 is incident to, the spectral distribution of which is to be determined. The movable mirror grating 10 is hinged on an axis 14 perpendicular to the grating lines, as is exemplarily shown in FIG. 1. A detector line 16 consisting of several detector elements 16a, 16b, of which for reasons of clarity only two are provided with reference numerals, is arranged in order to receive light 18, which is split up into its spectral constituents by means of movable mirror grating 10. Detector line 16 is arranged in a plane running through the axis of rotation 14 of mirror grating 10. The spectral resolution of the apparatus may be adjusted by means of the distance of line detector 16 to mirror grating 10. For moving the movable mirror grating 10, a suitable drive 20 is provided, which for the driving is coupled to the movable mirror grating 10 via an inductive, capacitive or mechanical coupling. A control unit 21, which is coupled to drive 20 on the one side and to detector 16 on the other, controls the moments of exposure, for which detector 16 performs recordings, relative to the movement of mirror grating 10. For this purpose, drive 20 (via a known correlation between drive and deflection, or by means of a specially provided detection means, as is described with respect to FIG. 1) detects the momentary position of mirror grating 10 and outputs a signal to control unit 21 indicating the momentary position. Control unit 21, in turn, determines the moments of exposure at which detector line 16 is to perform recordings and, for this purpose, sends initiating signals to detector line 16.

At a given moment, each detector element 16a, 16b, detects a spectral constituent 18 of a beam of light 12, which is mirrored onto the detector line and simultaneously scattered by means of the deflection of mirror grating 10. Here, the scattering plane runs through the axis of rotation 14, which is positioned perpendicular to the grating lines, and line detector 16. These circumstances are to be clarified once again, referring to the representation of FIG. 2b.

FIG. 2b shows a side view of an arrangement of mirror grating 10 and line detector 16. Here, the axis of rotation 14 of the mirror grating extends perpendicularly past the image plane, such as does line detector 16.

As can be seen in FIG. 2b, a beam of light 12a running perpendicularly to the axis of rotation 14 is incident on mirror grating 10 at a suitable angle of incidence $\alpha$, such that same is reflected by the mirror according to the known physical principle of angle of incidence=angle of reflection, and by the grating arrangement is scattered in a plane which is formed by the axis of rotation 14 and detector line 16. The fact that the detector line 16 is positioned relative to mirror grating 10 at an angle of reflection $\alpha$ having the same amount as the angle of incidence makes it possible for detector line 16 to sample the reflected spectral dispersion 18a of the beam of light 12a. As can be seen in FIG. 2b, a beam of light 12b, which is incident perpendicularly to the axis of rotation 14 in another angle of incidence $\beta$, is reflected and scattered by mirror grating 10 such that its image 18b may not be captured by detector line 16. If mirror grating 10 were deflected clockwise by the angle ($\beta$-$\alpha$), the spectral dispersion 18b of the beam of light 12b could be sampled by detector line 16. Therefore, it is obvious for a person skilled in the art that with an inventive apparatus, beams of light emanating from arbitrary dots on a geometrical line may be spectrally dispersed.

Referring to FIG. 2a, according to the invention, a first recording by means of line detector 16 is performed in order to determine the spectral distribution of the beam of light 12 emanating from a first dot at a location $x_1$ on the geometrical line. For this recording, each detector element 16a and 16b detects a different spectral constituent of the light 18 is dispersed into its spectral constituents. Detector line 16 outputs the result of the first recording, the result being schematically shown as a graph at 22, for which the intensity $I(\lambda, x_1)$ is plotted above wavelength $\lambda$, and for which an exemplary course of intensity is assumed. After the first recording, drive 20 moves the movable grating 10 in another position. Detector line 16 executes the second recording, which corresponds to a second dot at a location $x_2$ on the geometrical line to be imaged. The result of the second recording or exposure is schematically shown in a graph 24 in which, again, the intensity $I(\lambda,x_2)$ is plotted above wavelength $\lambda$. Both recordings 22 and 24 are forwarded to a combination means 26, which is connected both to detector line 16 in order to receive thereof the intensity values of each detector element at each moment of exposure, and to drive 20 via control unit 21 in order to receive from one of them information regarding the position of grating 10 at the moments of exposure, and which on the basis of recordings 22 and 24 supplies a result 28, which corresponds to the determination of the spectral distribution of the beams of light 12 emanating from the two dots of the geometrical line and is schematically represented in FIG. 2 in the form of a graph for two measured dots on the line on which, again, the intensities $I(\lambda,x_1)$ and $I(\lambda,x_2)$ are plotted above wavelength $\lambda$. In the described manner, beams of light of a random number of dots on a geometrical line may be spectrally dispersed by means of deflecting the grating. The size of an angle increment between two discrete angles of deflections depends on the desired geometrical resolution.

Figure 3A:
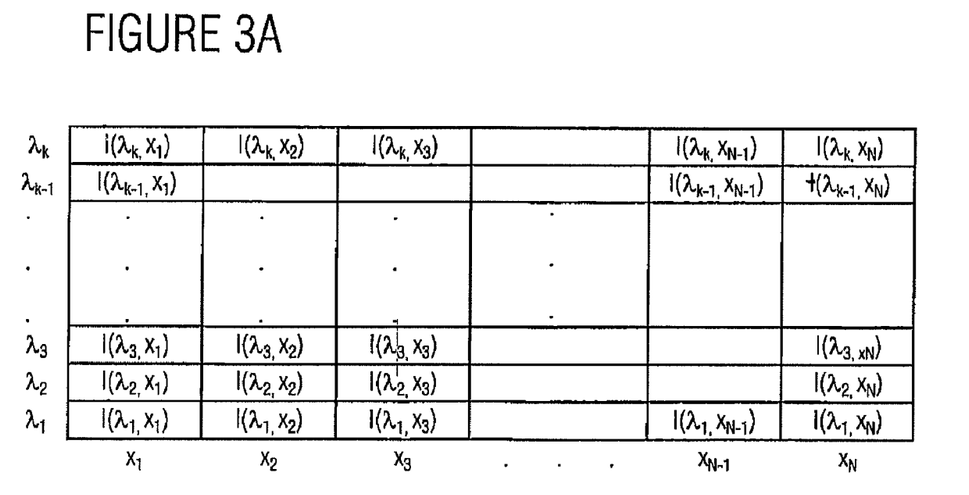
FIG. 3a is a schematic representation of a structure for storing the spectral distribution of beams of light emanating from N different dots of a geometrical line.

FIG. 3a shows a schematic representation of a matrix for storing the spectral distribution of beams of light emanating from N different dots of a geometrical line. By means of latching the spectral distribution of several dots, demands on the computing power of an evaluation means (not shown) may be substantially reduced.

Each column of the shown matrix exhibits K intensity values, wherein each of these K intensity values corresponds to a column of a certain wavelength $\lambda_k$ (k=1, . . . , K). In turn, each column corresponds to a location $x_n$ (n=1, . . . , N) of one of N dots on the geometrical line. This leads to a total of K×N intensity values $I(\lambda_k,x_n)$ for the spectral distribution of N beams of light emanating from N dots on the geometrical line, determined by a line detector with K detector elements.

Given a typical resolution of an inventive apparatus of N=3,000 dots of a line and a line detector with K=256 elements, the result will be 0.78 million spectral intensity values per line.

Figure 3B:
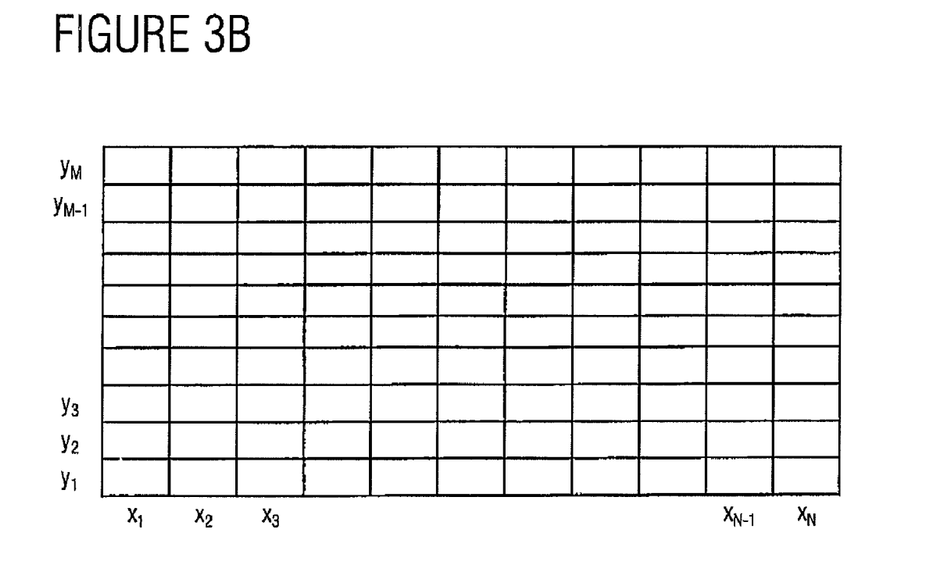
FIG. 3b is a representation of a surface divided into N×M discrete areas.

FIG. 3b shows a representation of a surface split into N×M discrete areas. A first dimension in the x-direction of the surface is detected by means of the movement or oscillation of the dispersive element of an inventive apparatus on its axis of rotation, while a second dimension in the y-direction of the surface is detected by a relative movement of an inventive apparatus opposite to a geometrical plane to be spectrally detected.

Figure 3C:
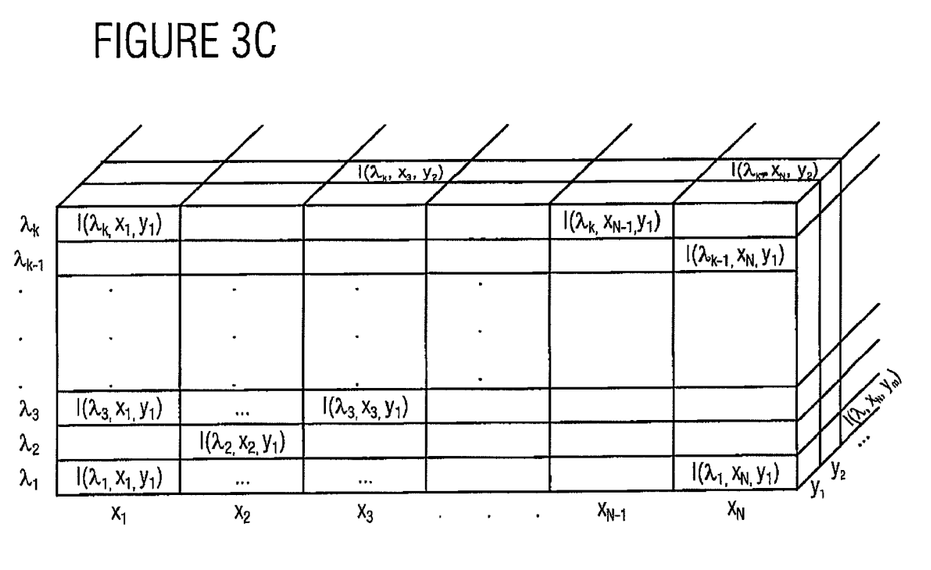
FIG. 3c is a schematic representation of a structure for storing the spectral distribution of beams of light emanating from the surface shown in FIG. 3b.

The spectral detection of the surface illustrated in FIG. 3b, which is formed by lining up M adjacent geometrical lines at the locations $y_m$ (m=1, . . . , M) with N dots each, may be stored, for example, by means of a structure as is schematically shown in FIG. 3c. FIG. 3c represents an expansion of the structure shown in FIG. 3a by one dimension $y_m$ (m=1, . . . , M). Here, each $y_m$ corresponds to the position of a sampled geometrical line. Thus, to each geometrical location $(x_n,y_m)$ (n=1, . . . , N; m=1, . . . , M) of the surface of FIG. 3b, K spectral intensity values $I(\lambda_k,x_n,y_m)$ (k=1, . . . , K) may be allocated.

Figure 3D:
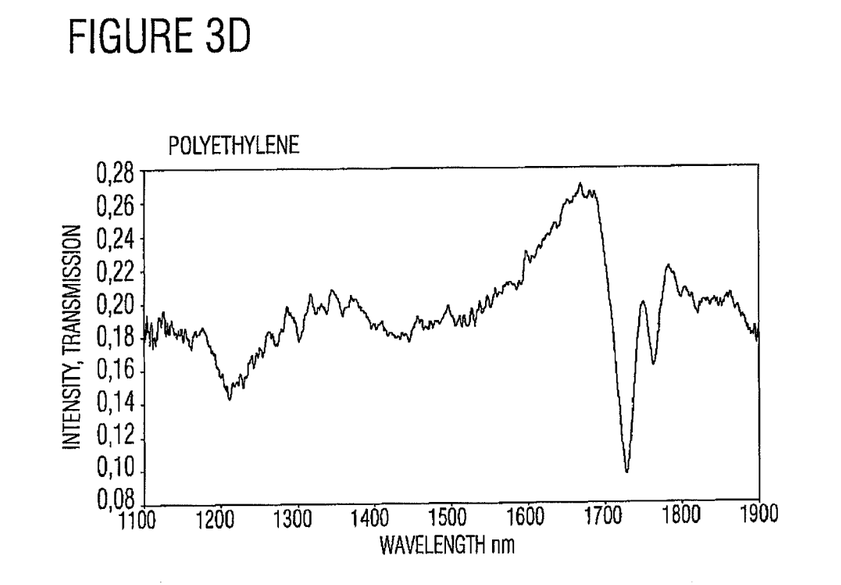
FIG. 3d is a characteristic spectral intensity course of polyethylene.

By means of a correlation of the spectral intensity course $I(\lambda_k,x_n,y_m)$ of a dot $(x_n,y_m)$ (n=1, . . . , N; m=1, . . . , M) of the surface with characteristic spectra of substances of interest in an evaluation means, for example to each dot $(x_n,y_m)$ of the surface, one of the substances of interest may possibly be allocated. For purposes of illustration, a characteristic spectral intensity course of polyethylene is represented in FIG. 3d.

In a further embodiment of the present invention, the storing of the spectral intensity courses of several dots is omitted for reasons of storage space. Rather, directly after a recording of a spectral intensity course $I(\lambda,x_n)$ at a dot $x_n$ by means of line detector 16, this intensity course $I(\lambda,x_n)$ is correlated with previously stored reference intensity courses of substances to be detected. As a result, dot $x_n$ may possibly be directly allocated to a certain substance to be detected. In this embodiment, instead of the entire spectral intensity course of a dot $x_n$ (n=1, . . . , N) of the line, only one substance to be detected must be stored per dot, which may substantially reduce the storage expenditure compared to the embodiment described above.

FIG. 2c shows an embodiment of the present invention similar to the embodiment of FIG. 2a in perspective representation. FIG. 2c additionally shows an entrance gap 30 for light 12. Entrance gap 30 is necessary, for example, in order to shield the light 12 emanating from the geometrical line to be inspected from the light of adjacent areas of no interest. This especially may be the case when the geometrical line to be examined and its environment are illuminated by a separate light source.

Figure 4:
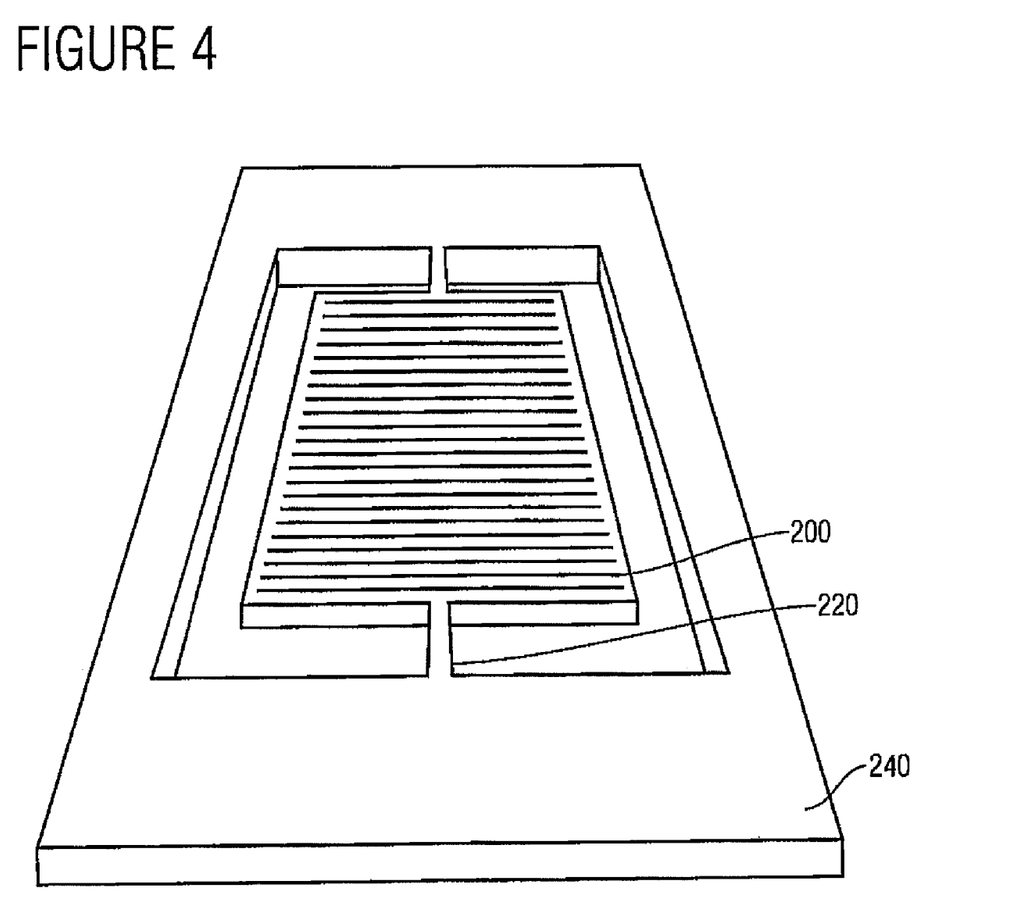
FIG. 4 is a schematic representation of a device fabricated in silicon micro technology having a grating structure.

With respect to the movable grating, it is to be understood that same, as is described with respect to FIG. 1, may for example be a micromechanically fabricated mirror with a microstructure as the grating, as is exemplarily indicated in FIG. 4. FIG. 4 shows a grating structure 200 with an axis of rotation 220, which runs at least approximately perpendicular to the grating lines. Here, the angle between the axis of rotation 220 and the grating lines may lie in a range of 90°±30°. The grating structure 200 and the axis of rotation 220 may for example be incorporated in a silicon substrate 240 by means of an etching process, the grating structure having exemplary dimensions of 3×3 mm².

It is to be noted that, although in the embodiments previously described, a mirror with a grating structure, that is a grating used in reflection, was used as the dispersive element, same may also be a grating in transmission or else a prism-shaped item, in which case the detector line must then be suitably positioned relative to the dispersive element and the dot of the geometrical line to be imaged.

It is further understood that instead of a quasi-static movement, as is described with respect to FIG. 1, the dispersive element may further be set oscillating, and particularly resonantly oscillating, by performing the variation of the deflected position correspondingly fast at an oscillation frequency $\omega_0$ by means of the control unit. In the case of a miniaturization because of the resonance camber, an oscillation frequency close to the resonance frequency enables high deflections at a justifiable energy expenditure and also ensures that the line camera is insensitive to jolts and vibrations and only calls for minimal or no calibration.

Figure 5A:
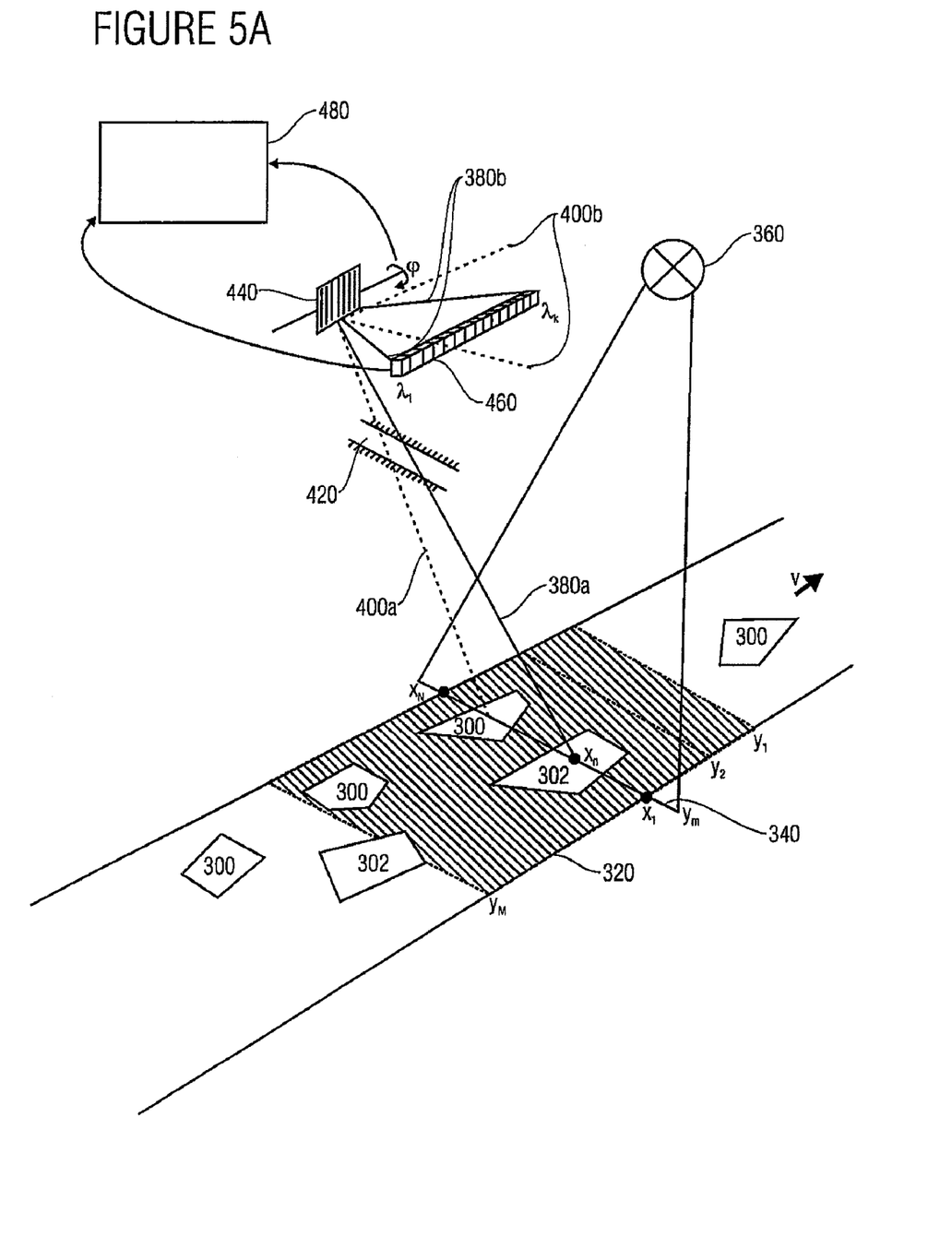
FIG. 5a is a schematic perspective representation of an application scenario of an inventive line camera.
Figure 5B:
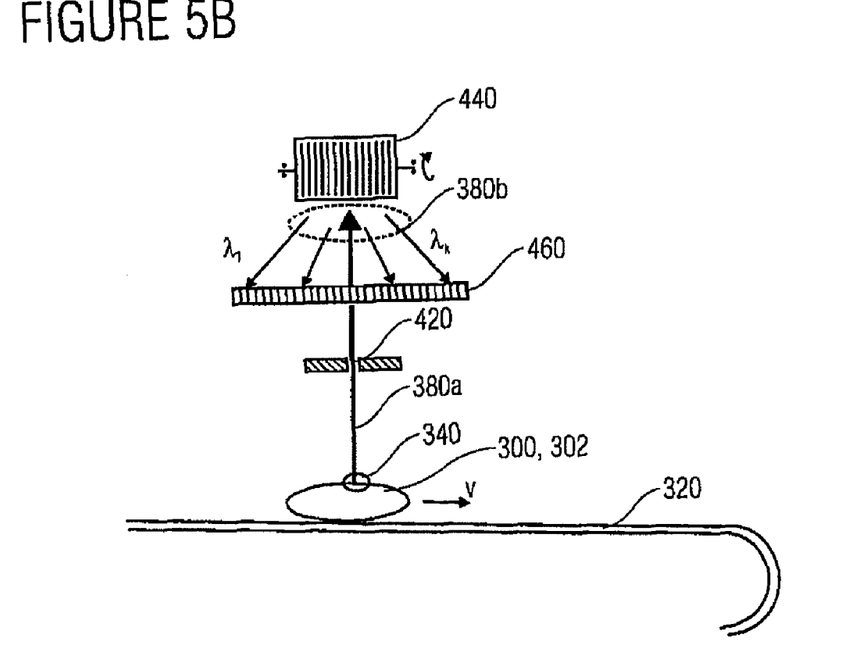
Figure 5C:
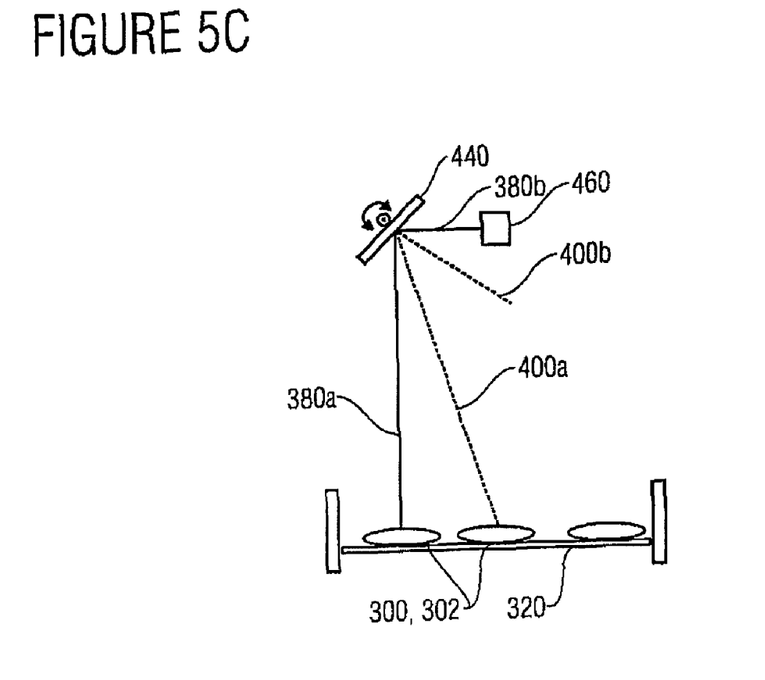

Referring to FIGS. 5a to 5c, an embodiment of an inventive system for examining a geometrical surface is described in the following by means of a possible application example. FIG. 5a represents the arrangement in a schematic perspective, while FIGS. 5b and 5c show the same arrangement in a schematic sectional elevation and a cross-section respectively.

It is to be noted here that the described geometrical lines and surfaces to be examined are generally projection lines and surfaces. That is, not the lines and surfaces as such but three-dimensional objects are examined, which are at least partially imaged on these lines and/or surfaces.

FIG. 5a shows two differing objects 300 and 302 to be inspected, which move on a conveying means 320 at a velocity v. A linear range 340, defined by starting dot $x_1$ and end dot $x_N$ on level $y_m$ of conveying means 320, which runs at right angles to the direction of movement of conveying means 320, is irradiated by a light source 360. Two beams of light 380a and 400a reflected by different dots of the linear range 340 are incident at different angles on a hinged mirror grating 440 through a slot-shaped entrance area 420 above conveying means 320. At the mirror grating, they are reflected and simultaneously spectrally dispersed into components 380b and/or 400b with wavelengths $\lambda_1$ to $\lambda_K$. For the detection of the spectral dispersions 380b and/or 400b, a line detector 460 is mounted opposite the mirror grating (see also FIG. 5b). Both the moments of exposure of the line detector and the movement of the mirror grating are controlled by a control means 480 connected to line detector 460 and mirror grating 440.

The aim is to determine the spectral properties of the conveyed objects 300, 302. For this, the beams of light 380a and 400a reflected by different dots of the linear area 340 are incident on the hinged mirror grating 440 at different angles through the slot-shaped entrance area 420. By means of reflection and simultaneous spectral dispersion of a reflected beam of light at a mirror grating deflected at a certain angle, only the spectral dispersion of the beam of light 380a is detected at the line detector, as is indicated in FIG. 5a. As the angle of incidence of the beam of light 400a does not match the position of the line detector opposite mirror grating 440, its spectral dispersion 400b is reflected past line detector 460.

This circumstance has already been described with respect to FIG. 2b and for a more clear understanding, this is additionally represented in FIG. 5c in the schematic cross-sectional view of the arrangement of FIG. 5a.

If mirror grating 440 is rotated clockwise by the difference of the two angles of incidence of the beams of light 380a and 400a, the reflection plane of the spectral dispersion of the beam of light 400a will run through line detector 460. The spectral dispersion of the beam of light 400a may now be sampled by line detector 460. By rotation of mirror grating 440 on its axis of rotation, each dot $x_n$ (n=1, ..., N) of the geometrical line 340 may be spectrally detected by line detector 460. Provided that the movement of grating 440 takes place fast compared to the movement of the conveyer belt 320, optical detection of the conveyed objects 300, 302 may take place along the lines on the levels $y_m$ (m=1, ..., M) in a good quality by means of control computer 480. Here, the optical detection through control computer 480 may take place according to the scheme described in FIGS. 3b to 3d, which in the following will be discussed again according to FIG. 5d.

Figure 5D:
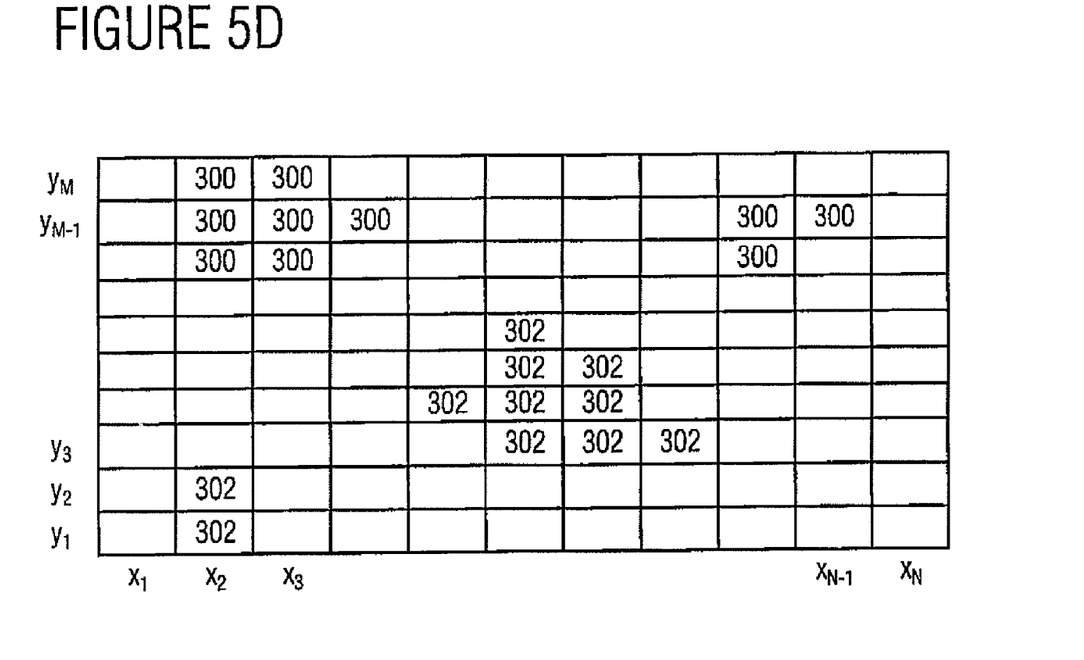
FIG. 5d is a representation of a surface divided into N×M discrete areas with several objects.

FIG. 5d shows a representation of a surface split into N×M discrete dots and corresponding to the portion of conveyer belt 320 in hatched representation in FIG. 5a, on which several objects 300 and 302 to be inspected may be positioned.

The spectral detection of the surface represented in FIG. 5d, which is created by the lining up of M adjacent geometrical lines at the locations $y_m$ (m=1, ..., M) with N dots each, is effected for example by means of a structure as is, described with FIG. 3c. Therefore, to each geometrical location $(x_n,y_m)$ (n=1, ..., N; m=1, ..., M) of the surface of FIG. 5d, K values of spectral intensity $I(\lambda_k,x_n,y_m)$ (k=1, ..., K) may be allocated. By means of a correlation of the spectral intensity courses $I(\lambda_k,x_n,y_m)$ of all dots $(x_n,y_m)$ (n=1, ..., N; M=1, ..., M) of the surface with characteristic spectra of substances of interest 300, 302, each dot $(x_n,y_m)$ of the conveyer-belt surface may be allocated one of the substances of interest 300, 302, as is shown in FIG. 5d.

In a further embodiment, storage of the spectral intensity courses of several dots may also be omitted for reasons of storage space, as has already been discussed. Rather, directly after a recording of a spectral intensity course $I(\lambda,x_n)$ at a dot $x_n$ by line detector 460, this intensity course $I(\lambda,x_n)$ may be correlated with previously stored reference intensity courses of the substances 300, 302 to be detected. As a result, dot $x_n$ may possibly be allocated directly to a certain substance to be detected. Instead of the entire spectral intensity course of a dot $x_n$ (n=1, ..., N) of the line, only one substance 300, 302 to be detected needs to be stored per dot in this embodiment, which may substantially reduce storage expenditure.

That is to say, objects 300, 302 of different qualities may be differentiated by means of their spectra and for example be separated by driving suitable actuators (not shown in the FIGS.).

The described embodiments of an inventive system in FIGS. 5a to 5c are operable in different operation modes. In a first operation mode, grating 440 is deflected by means of an oscillation, in particular a resonant oscillation. In this case, the grating control means 480 causes the grating to oscillate on its axis of rotation at for example substantially the resonance frequency of the grating. The drive is effected by means of the drive circuit, for example via a similar mechanical, inductive or capacitive or any other suitable coupling, as described for FIG. 1. Control means 480, which regulates the oscillation frequency of the grating, detects a momentary position of the grating and processes this information further. To the movable grating, a resonance or natural frequency $\omega_0$ for oscillations in the idle position on its axis of rotation is allocated, the frequency being dependent on the spring constant of the suspension and/or support as well as the dimensions of the grating and in the vicinity of which resonance camber takes place. The degree of resonance camber depends on the quality of the oscillation system consisting of support and suspended grating. Driving the grating by means of oscillation would have a kind of a sampling function regarding the linear range 340, in which the linear range would be sampled in one direction during the first semi-oscillation, and in a direction opposite to the first direction during the second half wave.

In the case of the oscillating grating, control unit 480 outputs the initiating pulses to line detector 460 at a frequency which corresponds to an integer multiple 2N of the grating oscillation frequency. This way, per first semi-oscillation N recordings of the spectral distribution of the light emanating from N different dots of the linear range 340 are created. During the second semi-oscillation, in which the conveyer belt 320 has moved slightly further when compared to the first semi-oscillation, the grating travels the linear range 340 in the opposite direction. By this, again N recordings of the spectral distribution of the light emanating from N different dots of the linear range 340 are created.

Another embodiment is conceivable, in which per first semi-oscillation N recordings of the spectral distribution of the light emanating from N different dots of the linear range 340 are created. In the second semi-oscillation, the grating travels the linear range 340 in the opposite direction without any recordings being made during this return movement. A logic for the synchronization of control means 480 for controlling means for deflecting mirror grating 440 and the detector may simplify this process.

By means of the movement of the conveyed object 300 and 302, which is slow when compared to the oscillation frequency, at the velocity v relative to the apparatus for the spectral detection of the geometrical line 340, the total spectral intensity distribution of a two-dimensional surface may be calculated by means of the evaluation and control unit 480, as has already been described above referring to FIG. 3c and FIG. 5d. In turn, on the basis of this intensity distribution, the conveyed objects 300 and 302 may be differentiated.

Referring to FIGS. 5a to 5c, it is to be understood that control unit 480 could determine the moments of exposure and/or sampling of line detector 460 for example such that same are effected at a certain position of mirror grating 440 or at a certain deflection thereof. Therefore, control unit 480 could control the recording and/or the shutter function of detector line 460. As a result, each sampling of detector line 460 output to computer unit 480 would correspond to a certain dot on the linear range 340, being allocated to the special position or deflection of grating 440. By varying the displacement of grating 440, the linear range 340 to be analyzed could, for example, be manually changed via a rotary switch or in a programmable manner.

With respect to further application possibilities, it is also conceivable that the line camera itself be moved relative to the surface to be analyzed. Applications for example in satellites or in other flying objects for earth surveillance are conceivable in which, for example, a landscape is to be examined for optical properties, such as characteristic plant properties (such as the color of the flowers). Here, too, a spectral analysis of a two-dimensional surface is achieved in the end by the sampling process of a one-dimensional range and the relative movement at slow relative velocity being effected perpendicularly to same.

Furthermore, application possibilities of an inventive line camera are conceivable, in which both the camera itself and the objects to be analyzed are moved, such as in military applications, for example the detection of tanks in the desert from an aeroplane. Here, too, there is a relative movement perpendicular to the expansion of a linear range.

Numerous application examples of the form of a stationary detection unit and moved goods can be found in the recycling industry in the selection of plastic or paper waste, in agriculture in the selection of crops (for example potatoes/stones) as well as in the food and/or pharmaceutical sector. Moreover, a monitoring of water courses is conceivable, in which the line camera is for example mounted to a bridge across the water cause. Thus, a river flowing under the bridge may be monitored for ships, oil slicks, and the like.

Here, the inspection can be effected with or without an additional light source. Accordingly, the spectroscopic methods of emission, reflection and absorption measurement, fluorescent spectroscopy or the so-called Raman spectroscopy and/or related methods may be used. What is substantial is that of the optical signals incident at the detector, certain wavelengths or wavelength ranges are evaluated. This is effected—as described above—via wavelength-selecting optical assemblies (for example gratings) and detectors adjusted thereto. It is generally possible to increase the imaging quality of a linear range to be imaged on the detector line, for example by preventing rays of light from entering the line camera between two subsequent sampling moments of the detector. This can be achieved for example by the use of an optical shutter.

Bundling elements such as lenses, mirrors or the detector gap apertures already mentioned may also substantially enhance the image quality of an inventive apparatus.

Additional signal processing, in which the sampling dot is advantageously utilized, for example by a correlation of a known relative movement of the objects to be imaged and the corresponding cross-movement generated by the rotation of the grating, helps to further enhance the image quality of an inventive apparatus.

It should specifically be understood that depending on the conditions, the inventive scheme may also be implemented in software. Implementation may be effected on a digital storage medium, specifically a floppy disc or a CD with electronically readable control signs being able to co-operate with a programmable computer system and/or microcontroller such that the respective method is effected. In general, the invention thus also consists in a computer program product with a problem code for performing the inventive method stored on a machine-readable carrier when the computer program product is run on a computer and/or microcontroller. In other words, the invention may also be realized as a computer program with a program code for performing the method when the computer program is run on a computer and/or microcontroller.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. An apparatus for the detection of spectral information along a geometrical line, comprising:
 a dispersive element suspended from an axis of rotation for the spectral dispersion of an electromagnetic radiation from a range on the geometrical line into spectral constituents;
 a line detector for the detection of the spectral constituents of the radiation emanating from the range on the geometrical line, and
 a dispersive-element deflector, wherein the deflector is adapted to deflect the dispersive element on the axis of rotation so that depending on a angle of deflection a radiation from another range on the geometrical line is incident on the line detector.

2. The apparatus according to claim 1, further comprising: controller for controlling the dispersive-element deflector in order to vary the deflected position, so that for the detector, which is arranged in lines, a spectral distribution of different ranges lying on a geometrical line of emanating electromagnetic waves can be detected.

3. The apparatus according to claim 1, further comprising: a detector for the deflection of the dispersive element.

4. The apparatus according to claim 2, wherein the controller is adapted to vary the deflected position such that the dispersive element is set oscillating at an oscillation frequency.

5. The apparatus according to claim 4, wherein the oscillation is a resonant oscillation.

6. The apparatus according to claim 2, wherein the controller comprises:
 processor for synchronizing the control unit for controlling the dispersive-element deflector and the detector.

7. The apparatus according to claim 2, wherein the controller is adapted to control the detector such that same performs the detection at N moments during an oscillation, N being an integer number greater than or equal to 1.

8. The apparatus according to claim 1, wherein a deflection velocity of the dispersive element and a holding time can be variably adjusted.

9. The apparatus according to claim 1, further comprising: detector evaluator for reading the line detector, wherein the detector evaluator is adapted to determine by an angle of rotation, which range of the geometrical line the spectrum detected by the line detector is allocated to.

10. The apparatus according to claim 9, wherein the detector evaluator is adapted to evaluate specific optical properties of ranges along the geometrical line, by fluorescent or Raman spectroscopy, an area comprising one or more dots.

11. The apparatus according to claim 10, wherein the detector evaluator comprises a spectral comparator and a decider.

12. The apparatus according to claim 11, wherein the spectral comparator comprises a memory for spectral reference intensity courses of substances to be detected.

13. The apparatus according to claim 12, wherein the spectral comparator is further adapted to create correlations of a spectral intensity course of a range along the geometrical line detected by a line detector with the reference intensity courses stored in the memory.

14. The apparatus according to claim 11, wherein the decider is adapted to decide, by the correlations, which substance to be detected the area along the geometrical line comprises.

15. The apparatus according to claim 1, wherein to each possible position of the dispersive element a dot of the geometrical line is allocated.

16. The apparatus according to claim 1, wherein the dispersive element comprises structures that are advantageous for certain wavelengths.

17. The apparatus according to claim 1, wherein the dispersive element comprises a grating structure.

18. The apparatus according to claim 17, wherein the dispersive element is a mirror with a grating structure.

19. The apparatus according to claim 17, wherein the dispersive element comprises a permeable grating structure.

20. The apparatus according to claim 17, wherein the axis of rotation of the grating structure runs at least approximately perpendicular to the grating lines.

21. The apparatus according to claim 1, wherein the detector comprises several sensitive elements, each of which is allocated to a wavelength or a wavelength subrange.

22. The apparatus according to claim 1, wherein the detector is a photodiode line or a CCD line.

23. The apparatus according to claim 1, wherein shutter lenses, mirrors or detector gap apertures enhance imaging quality.

24. The apparatus according to claim 1, wherein the dispersive element is fabricated by silicon micromechanics, plastics technology, LIGA, molding technology or by precision mechanics.

25. The apparatus according to claim 1, further comprising:
an illuminator of the geometrical line.

26. The apparatus according to claim 25, wherein the illuminator of the geometrical line is adapted to emit light of a certain wavelength range.

27. A system for examining a geometrical surface, comprising:
an apparatus for the spectral detection of a geometrical line, comprising:
a dispersive element suspended from an axis of rotation for the spectral dispersion of an electromagnetic radiation from a range on the geometrical line into spectral constituents;
a line detector for the detection of the spectral constituents of the radiation emanating from the range on the geometrical line, and
a dispersive-element deflector, wherein the deflector is adapted to deflect the dispersive element on the axis of rotation so that depending on a angle of deflection a radiation from another range on the geometrical line is incident on the line detector;
a generator of a relative movement of the surface with respect to the apparatus, wherein the apparatus for the spectral detection is adapted to detect a plurality of different geometrical lines on the basis of the relative movement running perpendicular to the geometrical line; and
a processor of the plurality of different geometrical lines in order to receive information on the constitution of the geometrical surface.

28. The system according to claim 27, wherein the apparatus for the spectral detection is adapted to spectrally detect at least 30 ranges of the geometrical line within a period of time in which the generator of the relative movement of the surface with respect to the apparatus for the spectral detection has advanced by a range that corresponds to the distance of two adjacent spectrally detectable ranges of the geometrical line.

29. The system according to claim 27, wherein the generator of the relative movement is a conveyer belt.

30. The system according to claim 27, wherein the generator of the relative movement is adapted to move the apparatus for the spectral detection of the geometrical line.

31. The system according to claim 30, wherein the generator of the relative movement is a flying object.

32. A method for the spectral detection of a geometrical line comprising:
spectrally dispersing an electromagnetic radiation of a range on a geometrical line into spectral constituents with a dispersive element, which is suspended from an axis of rotation;
detecting the spectral constituents of the radiation emanating from the range of the geometrical line with a line detector; and
deflecting the dispersive element on the axis of rotation, so that depending on a angle of deflection a radiation from another range of the geometrical line is incident on the line detector.

33. A method for the examination of a geometrical surface comprising:
spectrally dispersing an electromagnetic radiation from a range on the geometrical line into spectral constituents with a dispersive element, which is suspended from an axis of rotation
detecting the spectral constituents of the radiation emanating from the range on the geometrical line with a line detector; and
deflecting the dispersive element on the axis of rotation so that depending on a angle of deflection a radiation from another range on the geometrical line is incident on the line detector;
generating a relative movement of the surface with respect to the dispersive element and the line detector, wherein the dispersive element and the line detector are adapted to detect a plurality of different geometrical lines on the basis of the relative movement running perpendicular to the geometrical line; and
processing the plurality of different geometrical lines in order to receive information on the constitution of the geometrical surface.

34. A computer program with a program code for performing, when the computer program is executed on a computer or a microcontroller, a method for the spectral detection of a geometrical line, the method comprising:
spectrally dispersing an electromagnetic radiation of a range on a geometrical line into spectral constituents with a dispersive element, which is suspended from an axis of rotation;
detecting the spectral constituents of the radiation emanating from the range of the geometrical line with a line detector; and deflecting the dispersive element on the axis of rotation, so that depending on a angle of deflection a radiation from another range of the geometrical line is incident on the line detector.

35. A computer program with a program code for performing, when the computer program is executed on a computer or a microcontroller, a method for the examination of a geometrical surface, the method comprising:

spectrally dispersing an electromagnetic radiation from a range on the geometrical line into spectral constituents with a dispersive element, which is suspended from an axis of rotation detecting the spectral constituents of the radiation emanating from the range on the geometrical line with a line detector; and deflecting the dispersive element on the axis of rotation so that depending on a angle of deflection a radiation from another range on the geometrical line is incident on the line detector;

generating a relative movement of the surface with respect to the dispersive element and the line detector, wherein the dispersive element and the line detector are adapted to detect a plurality of different geometrical lines on the basis of the relative movement running perpendicular to the geometrical line; and processing the plurality of different geometrical lines in order to receive information on the constitution of the geometrical surface.

* * * * *